(12) United States Patent
Duan et al.

(10) Patent No.: US 7,353,568 B2
(45) Date of Patent: Apr. 8, 2008

(54) HINGE ASSEMBLY FOR FOLDABLE ELECTRONIC DEVICE

(75) Inventors: Chao Duan, Shenzhen (CN); Chia-Hua Chen, Tu-Cheng (TW)

(73) Assignees: Shenzhen Futaihong Precision Industrial Co., Ltd., BaoAn District, Shenzhen, Guangdong Province (CN); Sutech Trading Limited, Road Town, Tortola (VG)

( * ) Notice: Subject to any disclaimer, the term of this patent is extended or adjusted under 35 U.S.C. 154(b) by 249 days.

(21) Appl. No.: 11/212,862

(22) Filed: Aug. 26, 2005

(65) Prior Publication Data

US 2006/0045261 A1    Mar. 2, 2006

(30) Foreign Application Priority Data

Aug. 27, 2004   (CN) .................... 2004 1 0051299

(51) Int. Cl.
*E05D 11/10* (2006.01)

(52) U.S. Cl. .......................... 16/330; 16/326

(58) Field of Classification Search ............ 16/303, 16/330, 305, 326; 361/680–683; 379/433.12, 379/433.13; 348/373, 794, 333.06; 455/90.3, 455/575.1, 575.4, 575.8, 550.1

See application file for complete search history.

(56) References Cited

U.S. PATENT DOCUMENTS

| | | | |
|---|---|---|---|
| 3,292,204 A | 12/1966 | Tansey | |
| 6,085,387 A | 7/2000 | Han | |
| 6,148,180 A * | 11/2000 | Sato | 455/67.7 |
| 6,459,887 B2 * | 10/2002 | Okuda | 455/90.1 |
| 6,789,292 B2 * | 9/2004 | Oshima et al. | 16/297 |
| 6,886,221 B2 | 5/2005 | Minami et al. | |
| 7,007,345 B2 * | 3/2006 | Nakase et al. | 16/330 |
| 7,117,562 B2 * | 10/2006 | Zuo et al. | 16/303 |
| 7,168,133 B2 * | 1/2007 | Luo et al. | 16/303 |
| 7,184,275 B2 * | 2/2007 | Yamaguchi et al. | 361/755 |
| 7,213,301 B2 * | 5/2007 | Sakai et al. | 16/303 |
| 2003/0014840 A1 * | 1/2003 | Huong | 16/330 |

\* cited by examiner

*Primary Examiner*—Chuck Y. Mah
(74) *Attorney, Agent, or Firm*—Morris Manning Martin LLP; Tim Tingkang Xia, Esq.

(57) ABSTRACT

A hinge assembly (100) includes a rotating cam (10) having an inner screw thread (122) and a first cam surface (14) at one end thereof, a shaft (20) having an outer screw thread (242) engaging with the inner screw thread at one end thereof, a driven cam (30) having a second cam end (342), a sleeve (40) sliding relative to the driven cam, a first elastic element (50), a second elastic element (52), a sliding element (60), a locking element (70), and a button (90). The shaft extends through the rotating cam, the driven cam, the first elastic element, the sleeve, and the sliding element, and the locking element. The other end of the shaft is secured on the locking element. The button is slidably disposed on the locking element, one end of the button resists the sliding element.

18 Claims, 5 Drawing Sheets

HINGE ASSEMBLY FOR FOLDABLE ELECTRONIC DEVICE

FIELD OF THE INVENTION

The present invention relates to hinge assemblies, and particularly to a hinge assembly for a foldable electronic device such as a mobile telephone, an electronic notebook, and so on.

GENERAL BACKGROUND

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly welcome by consumers for their convenience.

Generally, foldable electronic devices have most of the electronics in one housing, called the main body. The other housing, called the flip cover, normally contains fewer electronic components than the main body. Other foldable electronic devices have all the electronics in the main body, with the flip cover containing no electronics. Various types of hinge assemblies are used to join a body and a cover of a foldable electronic device, so that the cover can unfold up from and fold down upon the body. Manufacturers are constantly seeking to reduce the volume, size and weight of portable radiotelephones. Thus, it is desirable that the hinge coupling the main body with the flip cover is modularized and miniaturized. A modularized hinge device has moving parts such as a cam member, a cam follower and a spring held together in a unified structure. The structure is easily and quickly attached to the main housing and the cover during mass production. A miniaturized hinge device has as few parts as possible, with the parts being as small as practicable.

One kind of hinge assembly employs a coil spring and a cam to make the flip cover open up from the main body and be held in an open position. An example of such kind of hinge assembly is disclosed in U.S. Pat. No. 6,085,387. The hinge assembly includes a can, a first member, a second member, and a spring. The can has a partially closed end and an open end. Two retaining protrusions are provided to close the open end by way of bending. The first member has a shaft protruding through the partially closed end of the can, and two protrusions defining a cam follower. The second member has a cam portion interacting with the cam follower. The cam portion includes at least a peak, two valleys separated by the peak, and slopes connecting the peak and the valleys. The spring pushes the second member toward the first member. The first member, the second member and the spring are contained within the can in turn. Then the protrusions are bent.

In the above-described hinge assembly, when the flip cover is only required to be opened to a small angle, the flip cover automatically rotates to a predetermined position by means of the engaging relationship of the cam follower of the first member and the cam portion of the second member. However, even though the movement track of the cam follower and the cam portion is the same when the mobile phone is opened or closed, the movement direction of the cam portion of the second member is contrary to that of the cam follower of the first member in both cases. This can result in excessive abrasion of elements of the hinge assembly, and thus reduce the effective working lifetime of the hinge assembly. In addition, the protrusions of the first member and the cam portions of the second member have symmetrically opposite configurations, so that the two steady positions of the flip cover are 180 degrees apart from each other. However, many mobile phones need to be opened to other positions such as 150 or 160 degree positions. This means that the body section of the mobile phone itself needs to be specially designed in order to limit the maximum opening angle of the flip cover. This takes up valuable "real estate" on the main body, and increases the complexity of manufacture of the main body. Furthermore, each time the flip cover is opened, it impacts the body section. The main body is liable to become worn or damaged, thereby shortening the working lifetime of the mobile phone. Moreover, a user must open the mobile phone with both hands. This makes the mobile phone awkward to utilize in situations when the user has only one hand free.

What is needed, therefore is to provide a new hinge assembly that overcomes the above-described problems.

SUMMARY

A hinge assembly for interconnecting a cover and a main body of a foldable electronic device includes a rotating cam having an inner screw thread and a first cam surface at one end thereof, a shaft having an outer screw thread engaging with the inner screw thread at one end thereof, a driven cam having a second cam end, a first elastic element, a second elastic element, a sliding element, a locking element, and a button. The shaft extends through the rotating cam, the driven cam, the first elastic element, the sleeve, and the sliding element, and the locking element. One end of the first elastic element abuts against the driven cam, the other end of the first elastic element urges on the locking element. The other end of the shaft is secured on the locking element. One end of the second elastic element resists the locking element, the other end of the second elastic element resists the sliding element. The button is slidably disposed on the locking element, one end of the button resists the sliding element.

When the hinge is installed in the mobile phone, opening and closing the flip cover is easy. The user need only press the button momentarily, whereupon the flip cover automatically rotates to a fully open position. Similarly, the user need only manually rotate the flip cover a predetermined angle toward a closed position, whereupon the flip cover automatically rotates to the fully closed position.

Other advantages and novel features will become more apparent from the following detailed description when taken in conjunction with the accompanying drawings, in which:

DETAILED DESCRIPTION OF PREFERRED EMBODIMENTS

Figure 1:
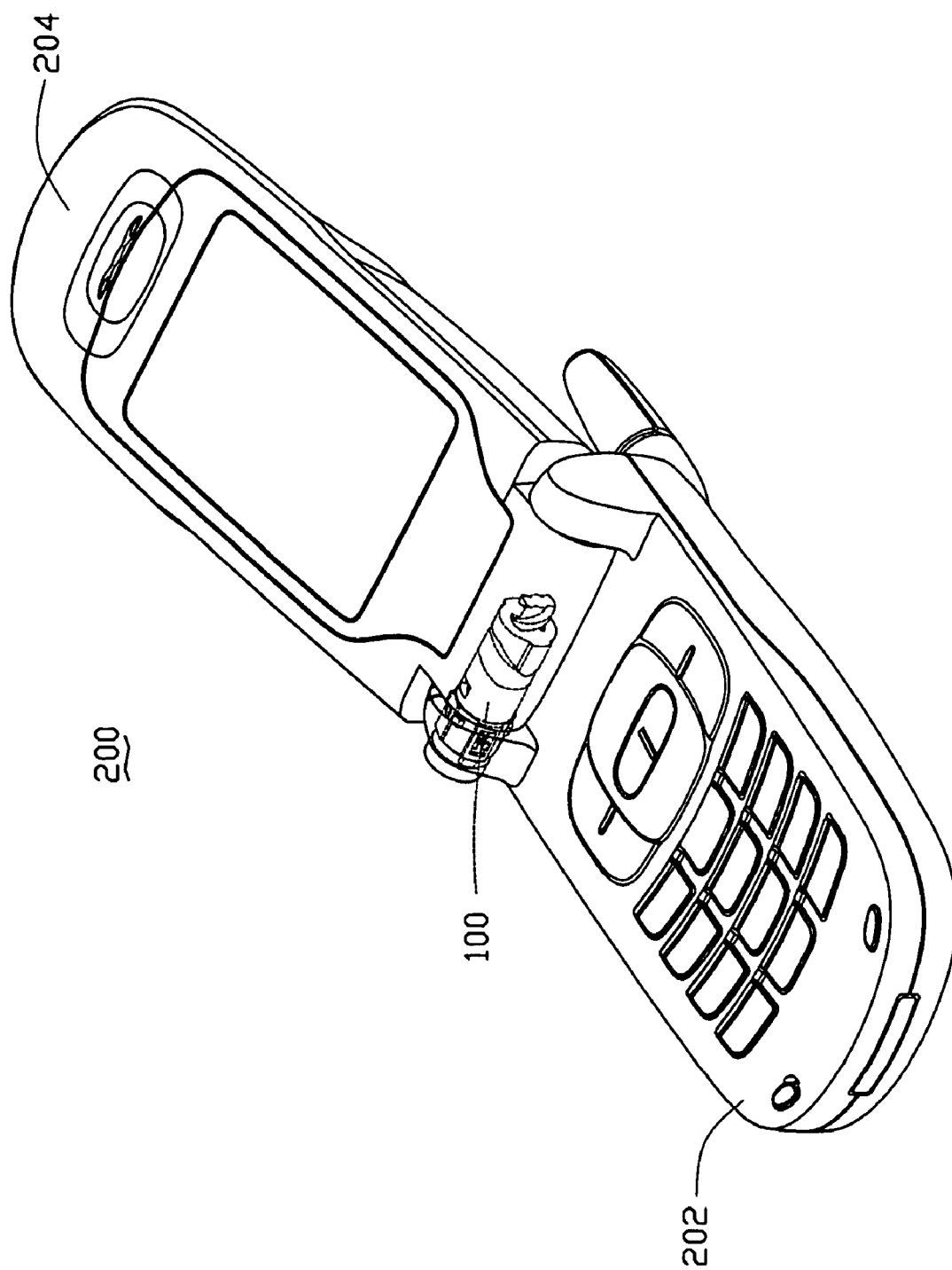
FIG. 1 is an isometric view of a flip type mobile phone including a flip cover, a main body, and a hinge assembly according to a preferred embodiment of the present invention, the hinge assembly being shown with dashed lines.

Referring now to the drawings, FIG. 1 shows a flip type mobile phone 200, which includes a hinge assembly 100 according to a preferred embodiment of the present invention. The mobile phone 200 has a main body 202 and a flip cover 204. The main body 202 and the flip cover 204 are pivotally connected to each other via the hinge assembly 100.

Figure 2:
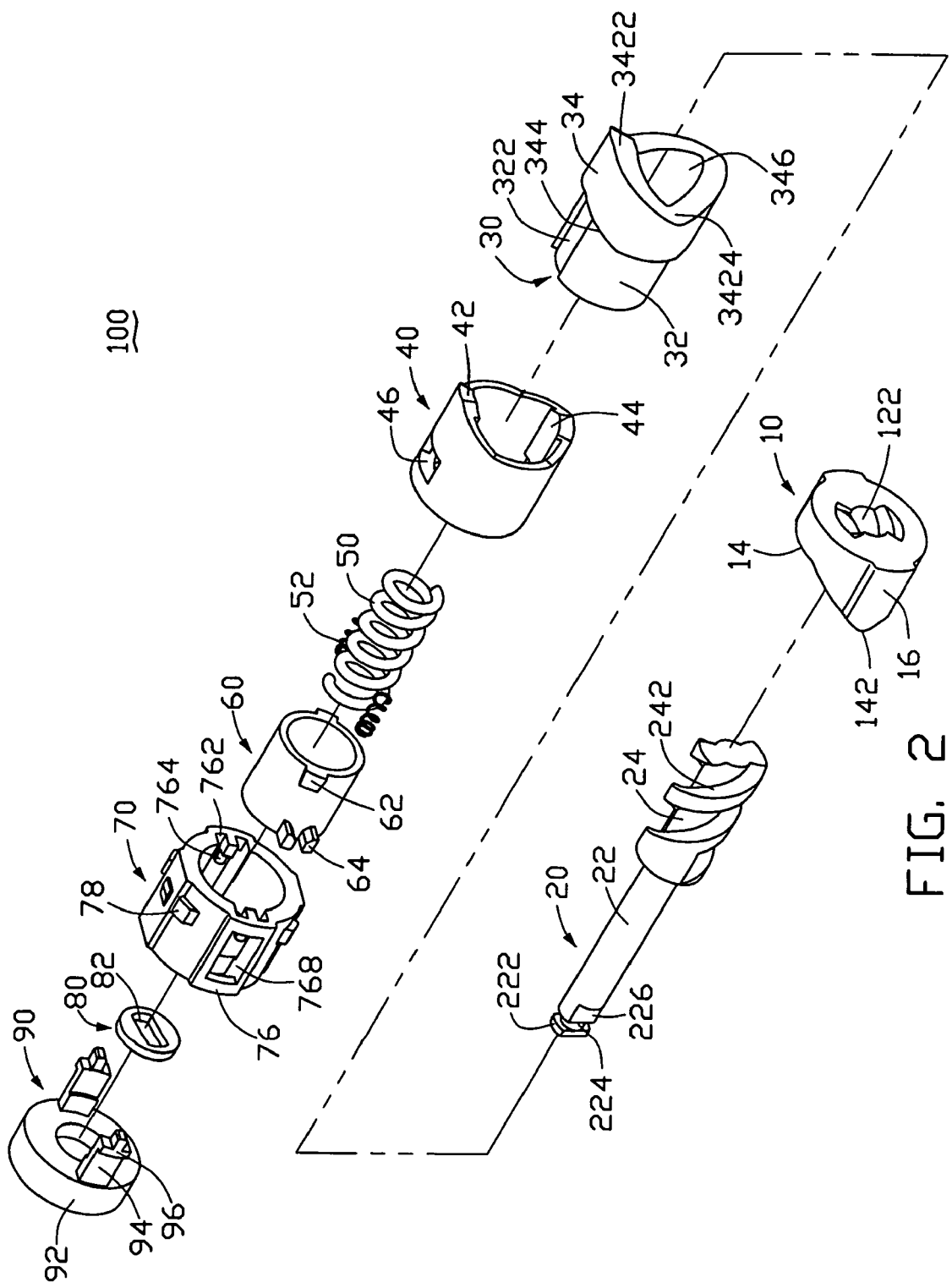
FIG. 2 is an exploded, isometric view of the hinge assembly of FIG. 1.
Figure 3:
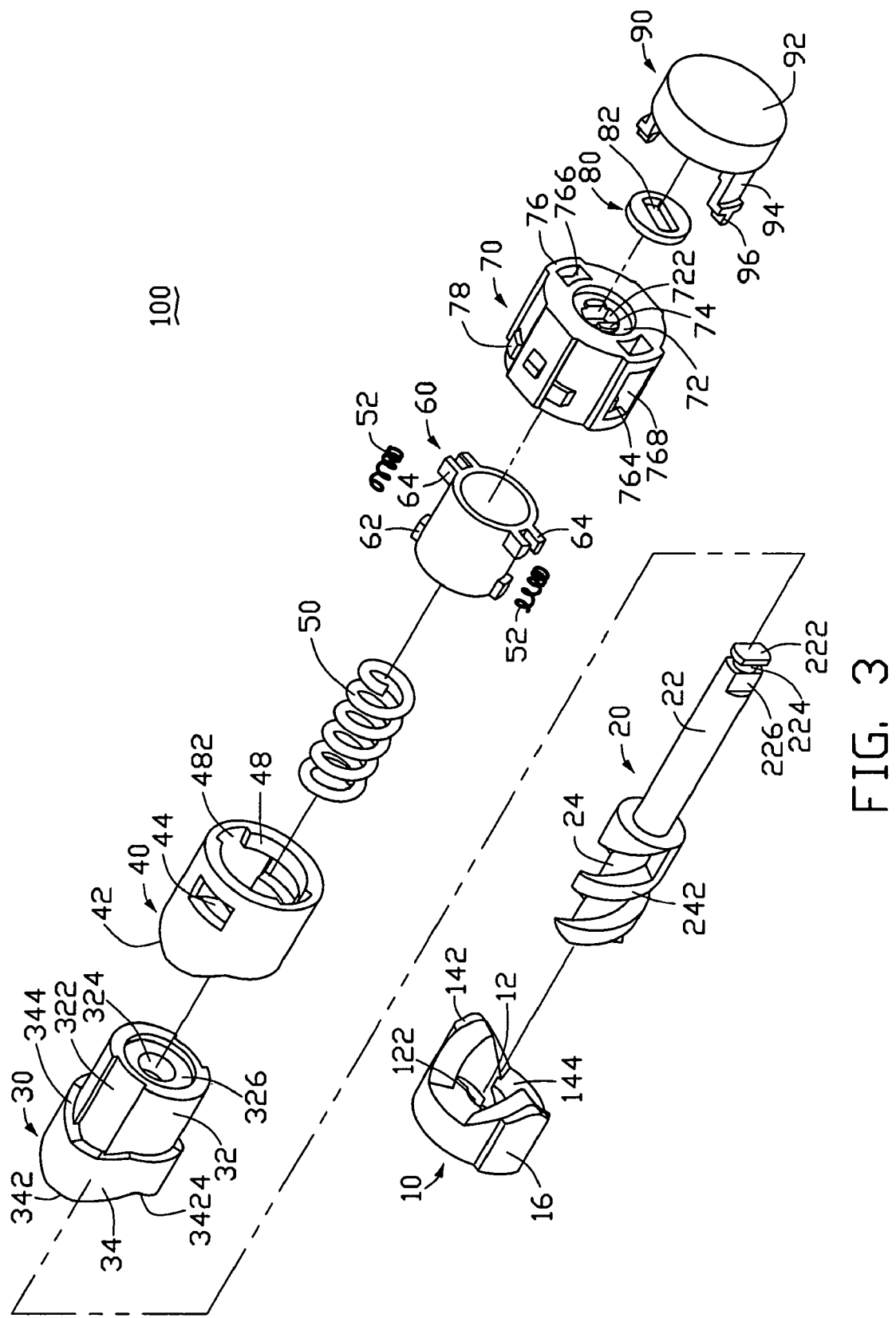
FIG. 3 is similar to FIG. 2, but viewed from another aspect.
Figure 4:
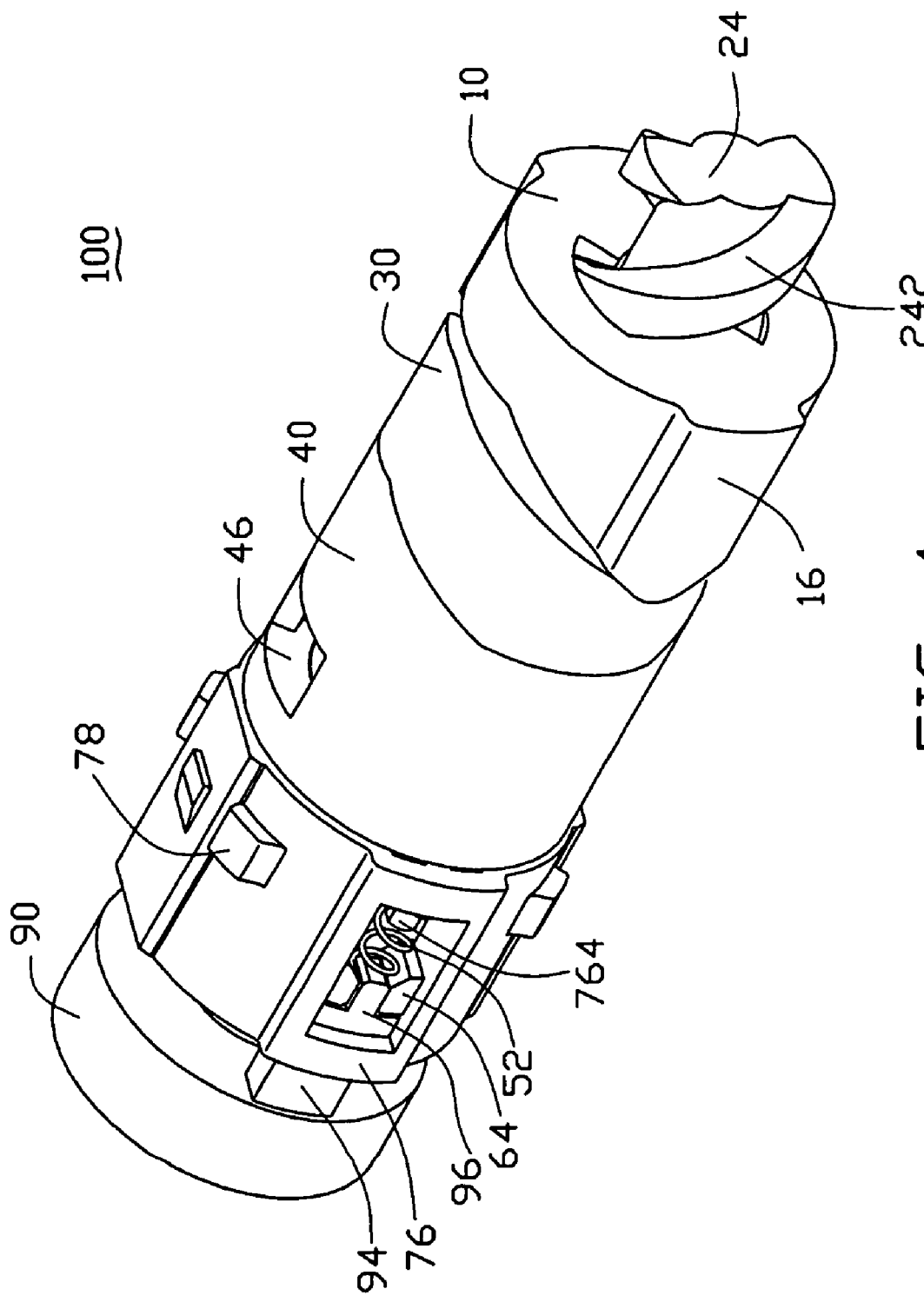
FIG. 4 is an assembled view of the hinge assembly of FIG. 2, and showing the hinge assembly positioned corresponding to a closed position of the flip type mobile phone.

FIG. 4 shows various parts of the hinge assembly 100. The hinge assembly 100 may be used to interconnect components like a main body and a flip cover of any of various different kinds of foldable electronic devices, such as the flip type mobile phone 200. Referring now to FIGS. 2 and 3, the hinge assembly 100 includes a rotating cam 10, a shaft 20, a driven cam 30, a sleeve 40, a compression spring 50 acting as a first elastic element, a driving spring 52 acting as a second elastic element, a sliding element 60, a locking element 70, a washer 80, and a button 90. The rotating cam 10, the driven cam 30, the sleeve 40, the compression spring 50, the sliding element 60, the locking element 70 and the washer 80 sequentially surround the shaft 20 and are coupled to each other. The shaft 20 is threadedly engaged with the rotating cam 10.

The rotating cam 10 is substantially a hollow cylinder. The rotating cam 10 comprises a first central hole 12 defined therein, and a first cam end 14 at an end thereof. The first central hole 12 has an inner screw thread 122 defined therein. The first cam end 14 includes two opposite first ridge portions 142, and two opposite first notch portions 144. The rotating cam 10 also has a pair of protruding blocks 16, for preventing the rotating cam 10 from rotating relative to the flip cover 204.

The shaft 20 includes a shaft portion 22 and a screw portion 24. The shaft portion 22 includes a resisting portion 222, a neck portion 224, and a keyed portion 226. The resisting portion 222, the neck portion 224 and the keyed portion 226 are formed at one end of the shaft portion 22. An outer screw thread 242 is defined on the screw portion 24. The screw portion 24 is engaged with the inner screw thread 122 of the rotating cam 10.

The driven cam 30 is substantially a hollow cylinder, and includes a body 32 and a cam portion 34. An outer diameter of the body 32 is smaller than that of the cam portion 34. One end of the body 32 adjoins the cam portion 34. The body 32 defines two opposite sliding slots 322 axially extending in the outer peripheral wall thereof, and a second central hole 324 in the other end thereof. The body 32 further defines a circular groove 326 around the second central hole 324. The cam portion 34 defines a second cam end 342, and a cam hole 346. The second cam end 342 includes two opposite second ridge portions 3422, and two opposite second notch portions 3424. The second cam end 342 is engaged with the first cam end 14 of the rotating cam 10. The cam portion 34 comprises a first curving surface 344 at an end thereof opposite to the second cam end 342. The cam hole 346 extends along an axial direction, and is in communication with the second central hole 324 of the body 32. A diameter of the cam hole 346 is greater than that of the second central hole 324. Therefore a step 328 (referring to FIG. 5) is formed where the cam hole 346 adjoins the second central hole 324.

The sleeve 40 is substantially a hollow cylinder. The sleeve 40 comprises a second curving surface 42 at one end thereof, corresponding to the first curving surface 344 of the driven cam 30. The sleeve 40 comprises two opposite sliding rails 44 extending along the axial direction at an inner surface thereof. The sleeve 40 defines two opposite arcuate openings 46 at the middle portion thereof. The sliding rails 44 axially extend from the second curving surface 42 to the openings 46. Two opposite arcuate protruding walls 48 extend radially inwardly from the other end of the sleeve 40. Two opposite latching notches 482 are defined between the arcuate protruding walls 48.

The compression spring 50 is a helical metallic spring. An outer diameter of the compression spring 50 is smaller than an inner diameter of the sleeve 40, and smaller than an inner diameter of the circular groove 326 of the driven cam 30. The compression spring 50 surrounds the shaft 20. One end of the compression spring 50 is engaged in the circular groove 326 of the driven cam 30, and abuts against the body 32 thereat. The other end of the compression spring 50 urges the locking element 70. The driving spring 52 is a helical metallic spring, with a diameter smaller than that of the compression spring 50.

The sliding element 60 is substantially a hollow cylinder. Two opposite latching blocks 62 are formed on an outer surface of the sliding element 60 adjacent one end thereof. Four sliding blocks 64 are formed on the outer surface of the sliding element 60 adjacent the other end thereof. One group of two neighboring sliding blocks 64 are arranged opposite to another group of two neighboring sliding blocks 64.

The locking element 70 is a generally cylindrical body, with one end thereof being open. The locking element 70 defines a circular receiving groove 72 at the other end thereof. The locking element 70 further defines a polygonal hole 722 in the center of the receiving groove 72. Two opposite latching protrusions 74 protrude outwardly from the receiving groove 72. Two opposite ear portions 76 are formed at an outer surface of the locking element 70, and extend from one end of the locking element 70 to the other end thereof. Each ear portion 76 defines two pairs of sliding slots 762 axially extending from the open end of the locking element 70 toward the other end thereof. A protruding post 764 is formed between the sliding slots 762 of each pair of sliding slots 762. Each ear portion 76 defines a square hole 766 in the open end of the locking element 70. Each ear portion 76 defines a rectangular hole 768, for receiving the sliding blocks 64 of the sliding element 60. A plurality of positioning blocks 78 is symmetrically formed at an outer surface of the locking element 70, for engagement with the main body 202 of the mobile phone 200.

The washer 80 defines a polygonal hole 82 therein. The shape of the polygonal hole 82 corresponds to the arrangement of the latching protrusions 74. The washer 80 is received in the receiving groove 72 of the locking element 70.

The button 90 includes a cylindrical pressing portion 92, two opposite arm portions 94, and two T-shaped abutting portions 96. The arm portions 94 extend in a same axial direction from a same end of the pressing portion 92. Each arm portion 94 is elastic. Each abutting portion 96 is formed at one end of a corresponding arm portion 94, and protrudes radially outwardly. The arm portions 94 are respectively inserted into the square holes 766 of the locking element 70. The abutting portions 96 are received in the rectangular holes 768 of the locking element 70, respectively.

Figure 5:
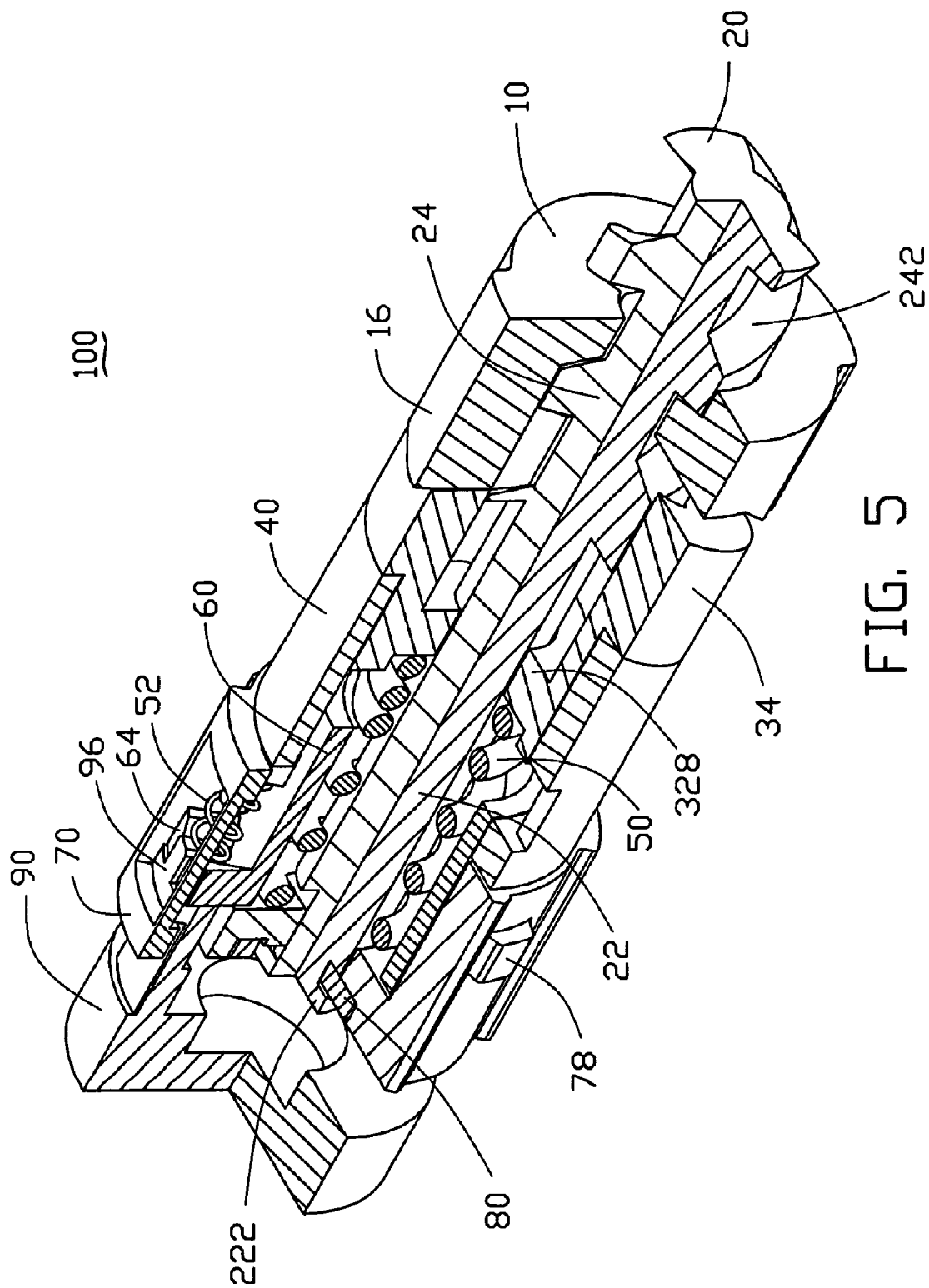
FIG. 5 is a cutaway view of the hinge assembly of FIG. 4.

Referring to FIGS. 4 and 5, in assembly of the hinge assembly 100, firstly, the screw portion 24 of the shaft 20 is threaded into the first central hole 12 of the rotating cam 10, with the outer screw thread 242 of the shaft 20 being engaged with the inner screw thread 122 of the rotating cam 10. Secondly, the shaft portion 22 of the shaft 20 is extended through the driven cam 30, the sleeve 40, the compression spring 50, the sliding element 60, and the polygonal hole 722 of the locking element 70 in that order. The second cam end 342 of the driven cam 30 is engaged with the first cam end 14 of the rotating cam 10. The sleeve 40 is placed around the body 32 of the driven cam 30, with the sliding rails 44 of the sleeve 40 slidably received in the sliding slots 322 of the driven cam 30, and the first curving end 344 of the driven cam 30 being engaged with the second curving end 42 of the sleeve 40. One end of the compression spring 50 abuts against the body 32 of the driven cam 30 in the circular groove 326, and the other end thereof urges on an inner bottom end portion of the locking element 70. The latching blocks 62 of the sliding element 60 are received in the latching notches 482 of the sleeve 40. The sliding blocks 64 are slid into the rectangular hole 768 of the locking element 70 along the sliding slots 762 of the locking element 70. Lastly, the resisting portion 222 of the shaft 20 extends out of the locking element 70 through the polygonal hole 722 thereof. The locking element 70 is pressed toward the screw portion 24 of the shaft 20 such that the resisting portion 222 and the neck portion 224 of the shaft 20 extend through the polygonal hole 722 of the locking element 70. Then, the washer 80 is placed around the resisting portion 222 of the shaft 20, and is positioned to surround the neck portion 224 of the shaft 20. The washer 80 is rotated relative to the shaft 20 about 90 degrees, and then is pressed into the receiving groove 72, with the latching protrusion 74 of the locking element 70 being engaged in the polygonal hole 82 of the washer 80. When the locking element 70 is released, the resisting portion 222 of the shaft 20 is latchingly engaged with the washer 80.

Next, the arm portions 92 of the button 90 are slightly pressed inwardly, and are then inserted into the square holes 766 of the locking element 70. When the arm portions 92 of the button 90 are completely received in the square holes 766 of the locking element 70, the arm portions 92 of the button 90 then rebound to their original shapes, with the abutting portions 94 fitting into the rectangular holes 768 of the locking element 70. The driving springs 52 are pressed and placed into the rectangular holes 768 of the locking element 70. One end of each driving spring 52 is coupled to the protruding post 764 of the locking element 70, and the other end of the driving spring 52 urges on the abutting portions 96 of the button 90 and is sandwiched between two adjacent sliding blocks 64 of the sliding element 60. The hinge assembly 100 is thus completely assembled, as shown in FIG. 4.

In use, referring to FIG. 1, the positioning blocks 78 of the locking element 70 are engaged with the main body 202 of the mobile phone 200. The protruding blocks 16 of the rotating cam 10 are engaged with the flip cover 204 of the mobile phone 200. The protruding blocks 16 are slidable relative to the flip cover 204, but cannot rotate relative to the flip cover 204. The button 90 is exposed at an outside of the main body 202.

Referring also to FIG. 5, this shows the hinge assembly 100 in a state corresponding to the mobile phone 200 having the flip cover 204 in a closed position. The second ridge portions 3422 of the driven cam 30 are engaged with the first concave portions 144 of the rotating cam 10. At this state, the compression spring 50 is in a compressed state, and resists the driven cam 30. An axial force generated by the compression spring 50 indirectly acts on the rotating cam 10 via the driven cam 30, whereby the rotating cam 10 has a potential tendency to move axially and rotate relative the shaft 20. However, the sliding rails 44 of the sleeve 40 are engaged in the sliding slots 322 of the driven cam 30. The latching blocks 62 of the sliding elements 60 are engaged in the latching notches 482 of the sleeve 40. The sliding element 60 is engaged with the locking element 70 that is secured to the main body 202 of the mobile phone 200. This restrains the rotating cam 10 and the driven cam 30 from movement and rotation relative to the shaft 20. Thus, the hinge assembly 100 is in a stable state.

When a user wants to open the flip cover 204, he/she may manually rotate the flip cover 204 up to an open position. In this process, the rotating cam 10 is rotated relative to the flip cover 204, and is moved axially away from the shaft portion 22 of the shaft 20 under the screw thread engagement between the outer screw thread 24 of the shaft 20 and the inner screw thread 122 of the rotating cam 10. The driven cam 30 is also axially moved together with the rotating cam 10 while under the spring force of the compression spring 50. Because the latching blocks 62 of the sliding elements 60 are engaged in the latching notches 482 of the sleeve 40 and the sliding rails 44 of the sleeve 40 are engaged in the sliding slots 322 of the driven cam 30, thereby the driven cam 30 and the sleeve 40 cannot rotate together with the rotating cam 10. In this process, the first ridge portions 142 of the rotating cam 10 slide out of the second notch portions 3424 of the driven cam 30, while abutting against the second cam end 342 of the driven cam 30. When the first ridge portions 142 of the rotating cam 10 slide to a position where the first ridge portions 142 abut against the second ridge portions 3422 of the driven cam 30, if the user releases the flip cover 204, the rotating cam 10 may continue to rotate relative to the shaft 20 along the second cam end 342 of the driven cam 30 under the spring force of the compression spring 50. The rotating cam 10 continues to thus rotate until the first ridge portions 142 thereof are engaged with the second notch portions 3424 of the driven cam 30 once again. The flip cover 204 is therefore rotated to the open position. Preferably, the structures of the flip cover 204 and the main body 202 are adapted so as to control the range of rotation of the hinge assembly 100, such that the first ridge portions 142 can be stationed in one particular position between the second ridge portions 3422 and the second notch portions 3424.

When the user wants to open the flip cover 204 of the mobile phone 200 automatically, he/she may press the button 90. In this process, the button 90 resists the driving spring 52 and is moved along the axial direction, while pushing the sliding blocks 64 of the sliding element 60 to move along the rectangular holes 768 of the locking element 70. The latching blocks 62 of the sliding element 60 are moved inwardly inside the sleeve 40 until the latching blocks 62 are disengaged from the latching notches 48 of the sleeve 40. The sleeve 40, the driven cam 30 and the rotating cam 10 are then rotated relative to the shaft 20 under the spring force of the compression spring 50. Meanwhile, the driven cam 30 and the rotating cam 10 are moved along the axial direction toward the screw portion 24 of the shaft 20, and the sleeve 40 remains in position because the arcuate protruding walls 48 of the sleeve 40 are blocked by the latching blocks 62 of the sliding element 60. When the flip cover 204 is rotated a predetermined degree, the latching blocks 62 of the sliding element 60 are moved into and engaged in the latching notches 48 of the sleeve 40 again under the spring force of the driving spring 52. The sleeve 40, the driven cam 30 and the rotating cam 10 are then restrained from movement and rotation relative to the shaft 20, and are in a stable state. The flip cover is then rotated to an open position.

When the user wants to close the flip cover 204, he/she may manually rotate down the flip cover 204 to the closed position. In this process, the rotating cam 10 is rotated along with the flip cover 204, and is moved along the axial direction toward the shaft portion 22 of the shaft 20. The driven cam 30 and the sleeve 40 remain in position due to the engagement of the sliding element 60. In this process, the first ridge portions 142 of the rotating cam 10 slide out of the second notch portions 3424 of the driven cam 30. Once the first ridge portions 142 of the rotating cam 10 slide to a position where the first ridge portions 142 abut against the second ridge portions 3422 of the driven cam 30, if the user releases the flip cover 204, the first ridge portions 142 continue to slide and the rotating cam 10 continues to rotate relative to the shaft 20 along the second cam end 342 of the driven cam 30 under the spring force of the compression spring 50. The rotating cam 30 continues to thus rotate until the first ridge portions 142 of the rotating cam 30 are engaged with the second notch portions 3424 of the driven cam 30. The flip cover 204 is thus rotated to a closed position.

In an alternative embodiment, the compression spring 50 and the driven spring 52 can be replaced by any other suitable kind of elastic elements or urging mechanisms known in the art. As described above, the user need only press the button 90, whereupon the flip cover 204 can automatically rotate to the open position. Similarly, the user need only manually rotate the flip cover 204 a predetermined angle toward the closed position, whereupon the flip cover 20 can automatically rotate to the closed position.

In another alternative embodiment, the sleeve 40 can be omitted.

As described above, the hinge assembly provides an automatic opening and closing feature for use in devices such as mobile phones. When the button is pushed, the hinge assembly can fully unfold the flip cover from the main body. This allows the user to open the mobile phone with one-handed operation.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for interconnecting a flip cover and a main body of a foldable electronic device, the hinge assembly comprising:
    a rotating cam having an inner screw thread and a first cam end at one end thereof;
    a shaft having an outer screw thread at one end thereof, the outer screw thread being engaged with the inner screw thread of the rotating cam;
    a driven cam having a second cam end at one end thereof, the driven cam configured for coupling with the flip cover, the second cam end engaging with the first cam end of the rotating cam;
    a first elastic element;
    a second elastic element;
    a sliding element;
    a locking element configured for coupling with the main body;
    a button; and
    a sleeve;
wherein the shaft extends through the rotating cam, the driven cam, the sleeve, the first elastic element, the sliding element, and the locking element in that order, the first elastic element extends through the sliding element, the sleeve slidably engages with the driven cam, the driven cam is partly received in the sleeve, one end of the first elastic element abuts against the driven cam, the other end of the first elastic element urges on the locking element, the other end of the shaft is secured to the locking element, the button slidably engages with the locking element, the sliding element is received in the locking element, one end of the second elastic element abuts against the locking element, the other end of the second elastic element urges on the sliding element for locking the sliding element with the sleeve and urges on the button for restoring the button when pressed, the button is configured for sliding the sliding element relative to the locking element so as to unlock the sliding element from the sleeve, and the first elastic element is configured for urging the driven cam combined with the rotating member and the sleeve to rotate relative to the shaft via the engagement between the inner screw thread of the rotating cam and the outer screw thread of the shaft.

2. The hinge assembly as claimed in claim 1, wherein the rotating cam comprises protruding blocks at an outer surface thereof.

3. The hinge assembly as claimed in claim 1, wherein the driven cam comprises a body and a cam portion, the second cam end of the driven cam is defined on the cam portion, the body defines at least one sliding slot and a second central hole at one end thereof, the cam portion defines a cam hole, the second central hole communicates with the cam hole, and the shaft extends through the cam hole and the second central hole.

4. The hinge assembly as claimed in claim 3, wherein the sleeve defines at least one sliding rail extending from one end thereof to a middle portion thereof, and the sliding rail is engaged in the sliding slot of the driven cam.

5. The hinge assembly as claimed in claim 4, wherein two opposite arcuate protruding walls extend radially inwardly from the other end of the sleeve, and two opposite latching notches are defined between the two arcuate protruding walls.

6. The hinge assembly as claimed in claim 5, wherein the locking element comprises two ends and two opposite ear portions, one of the two ends is open, and the ear portions are at an outer surface of the locking element and extend from the open end thereof to the other end thereof.

7. The hinge assembly as claimed in claim 6, wherein each ear portion defines two sliding slots axially extending from the open end of the locking element toward the other end of the locking element, and a protruding post is formed between the sliding slots.

8. The hinge assembly as claimed in claim 7, wherein each ear portion defines a square hole in the end of the locking element opposite to the open end of the locking element, and defines a rectangular hole in an outer surface thereof.

9. The hinge assembly as claimed in claim 8, wherein two opposite sliding blocks are disposed at an outer peripheral wall of the sliding element adjacent one end thereof, at least two latching blocks are disposed at the outer peripheral wall of the sliding element adjacent the other end thereof, the latching blocks are received in the latching notches of the sleeve, and the sliding blocks are received in the rectangular holes of the locking element.

10. The hinge assembly as claimed in claim 8, wherein the button comprises a cylindrical pressing portion, two opposite arm portions axially extending from one end of the pressing portion, and two T-shaped abutting portions disposed at ends of the arm portions and protruding outwardly, and the abutting portions are received in the rectangular holes of the locking element.

11. The hinge assembly as claimed in claim 10, wherein the second elastic element is a helical spring received in the rectangular hole of the locking element, one end of the second elastic element abuts against the abutting portion of the button and the latching blocks of the sliding element, and the other end of the second elastic element is coupled to the protruding post of the locking element while resisting the locking element.

12. The hinge assembly as claimed in claim 1, wherein the locking element is substantially a cylinder having an open end, and defines a cylindrical receiving groove in the other end thereof, the receiving groove defines a polygonal hole in a center thereof, and two opposite latching protrusions protrude from the receiving groove around the polygonal hole.

13. The hinge assembly as claimed in claim 12, further comprising a washer adapted for securing one end of the shaft to the locking element.

14. The hinge assembly as claimed in claim 13, wherein the washer defines a polygonal hole in the center thereof, a shape of the polygonal hole corresponds to an arrangement of the latching protrusions, and the washer is engaged in the receiving groove of the locking element.

15. The hinge assembly as claimed in claim 1, wherein a plurality of positioning blocks is symmetrically arranged at an outer surface of the locking element.

16. The hinge assembly as claimed in claim 1, wherein the first elastic element is a helical spring surrounding the shaft.

17. The hinge assembly as claimed in claim 1, wherein the first cam surface has a pair of opposite notch portions and a pair of opposite ridge portions.

18. An electronic device comprising:
a cover;
a main body; and
a hinge mechanism interconnecting the cover and the main body, the hinge mechanism comprising:
a rotating cam having an inner screw thread and a first cam end at one end thereof;
a shaft having an outer screw thread at one end thereof, the outer screw thread being engaged with the inner screw thread of the rotating cam;
a driven cam having a second cam end at one end thereof, the driven cam configured for coupling with the cover, the second cam end engaging with the first cam end of the rotating cam;
a first elastic element;
a second elastic element;
a sliding element;
a locking element configured for coupling with the main body;
a button; and
a sleeve;
wherein the shaft extends through the rotating cam, the driven cam, the sleeve, the first elastic element, the sliding element, and the locking element in that order, the first elastic element extends through the sliding element, the sleeve slidably engages with the driven cam, the driven cam is partly received in the sleeve, one end of the first elastic element abuts against the driven cam, the other end of the first elastic element urges on the locking element, the other end of the shaft is secured to the locking element, the button slidably engages with the locking element, the sliding element is received in the locking element, one end of the second elastic element abuts against the locking element, the other end of the second elastic element urges on the sliding element for locking the sliding element with the sleeve and urges on the button for restoring the button when pressed, the button is configured for sliding the sliding element relative to the locking element so as to unlock the sliding element from the sleeve, and the first elastic element is configured for urging the driven cam combined with the rotating member and the sleeve to rotate relative to the shaft via the engagement between the inner screw thread of the rotating cam and the outer screw thread of the shaft.

* * * * *